United States Patent
Rong et al.

(10) Patent No.: US 10,390,356 B2
(45) Date of Patent: *Aug. 20, 2019

(54) SYSTEMS AND METHODS FOR CONFIGURING AIR INTERFACES WITH LOW OVERHEAD

(71) Applicant: Huawei Technologies Co., Ltd., Shenzhen (CN)

(72) Inventors: Lu Rong, Shanghai (CN); Kelvin Kar Kin Au, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,205

(22) Filed: Jan. 23, 2018

(65) Prior Publication Data
US 2018/0152956 A1 May 31, 2018

Related U.S. Application Data

(63) Continuation of application No. 15/093,944, filed on Apr. 8, 2016, now Pat. No. 9,883,524.
(Continued)

(51) Int. Cl.
*H04W 72/12* (2009.01)
*H04W 72/04* (2009.01)
(Continued)

(52) U.S. Cl.
CPC ....... *H04W 72/1215* (2013.01); *H04L 1/0001* (2013.01); *H04L 1/0016* (2013.01);
(Continued)

(58) Field of Classification Search
CPC ............ H04W 72/1215; H04W 72/042; H04L 1/0029
See application file for complete search history.

(56) References Cited

U.S. PATENT DOCUMENTS

2006/0040645 A1 2/2006 Grilli et al.
2006/0087961 A1 4/2006 Chang et al.
(Continued)

FOREIGN PATENT DOCUMENTS

EP 3207462 A1 8/2017
JP 2008510395 A 4/2008
(Continued)

OTHER PUBLICATIONS

"QUALCOMM Europe", Default Configurations in Rel-6, 3GPPT TSG-RAN2 Meeting #43, R2-042410, Aug. 2004, 9 Pages, Prague, Czech Republic.
(Continued)

*Primary Examiner* — Christopher M Brandt
(74) *Attorney, Agent, or Firm* — Slater Matsil, LLP

(57) ABSTRACT

It is possible to reduce overhead when dynamically establishing an air interface configuration by communicating a modification instruction along with an index associated with a predefine air interface configuration. The modification instruction identifies a modification to one or more parameters of the predefined air interface configuration associated with the index. Together, the index and the modification indication specify a modified air interface configuration that is different than any of the candidate air interface configurations predefined for the network. The modification instruction allows networks to achieve similar degrees of flexibility while using substantially fewer predefined air interface configurations, which in turn permits the index associated with the selected air interface configuration to be signaled using fewer bits.

24 Claims, 5 Drawing Sheets

Related U.S. Application Data

(60) Provisional application No. 62/250,956, filed on Nov. 4, 2015.

(51) Int. Cl.
    *H04L 1/00*           (2006.01)
    *H04L 1/18*           (2006.01)
    *H04L 5/00*           (2006.01)
    *H04L 27/26*         (2006.01)

(52) U.S. Cl.
    CPC .......... *H04L 1/0029* (2013.01); *H04L 1/1825* (2013.01); *H04L 1/1887* (2013.01); *H04L 5/0053* (2013.01); *H04L 5/0091* (2013.01); *H04L 27/2607* (2013.01); *H04W 72/042* (2013.01)

(56) References Cited

U.S. PATENT DOCUMENTS

| | | |
|---|---|---|
| 2006/0153227 A1 | 7/2006 | Hwang et al. |
| 2006/0229102 A1 | 10/2006 | Kitazoe et al. |
| 2009/0149189 A1 | 6/2009 | Sammour et al. |
| 2009/0247163 A1 | 10/2009 | Aoyama |
| 2012/0179792 A1 | 7/2012 | Nie et al. |
| 2012/0263051 A1 | 10/2012 | Willars et al. |
| 2014/0301245 A1 | 10/2014 | Rose et al. |
| 2015/0163773 A1 | 6/2015 | Wang et al. |
| 2015/0181640 A1* | 6/2015 | Kwong ................ H04W 28/18 370/329 |
| 2015/0195818 A1 | 7/2015 | Davydov et al. |
| 2016/0142292 A1 | 5/2016 | Au et al. |

FOREIGN PATENT DOCUMENTS

| | | |
|---|---|---|
| WO | 2014147479 A2 | 9/2014 |
| WO | 2016077780 A1 | 5/2016 |

OTHER PUBLICATIONS

T. Mobile, "Deutsche Telekom & T-Mobile USA View of 5G", 3GPP RAN 5G WorkShop, RWS-150033, Sep. 2015, 11 Pages.

* cited by examiner

SYSTEMS AND METHODS FOR CONFIGURING AIR INTERFACES WITH LOW OVERHEAD

This patent application is a continuation of U.S. application Ser. No. 15/093,944 filed on Apr. 8, 2016 and entitled "Systems and Methods for Configuring Air Interfaces with Low Overhead," which claims priority to U.S. Provisional Application No. 62/250,956, filed on Nov. 4, 2015 and entitled "Systems and Methods for Configuring Air Interfaces with Low Overhead," both of which are hereby incorporated by reference herein as if reproduced in their entireties.

TECHNICAL FIELD

The present invention relates to wireless communications, and, in particular embodiments, to systems and methods for configuring air interfaces with low overhead.

BACKGROUND

Next-generation wireless networks will need to support diverse traffic types (e.g., voice, data, mobile-gaming), while providing high throughput rates over various, oftentimes changing, channel conditions. To achieve this, network devices may need to have the capability to dynamically establish different air interface configurations in an efficient manner. Accordingly, techniques for efficiently configuring air interfaces in wireless networks are desired.

SUMMARY OF THE INVENTION

Technical advantages are generally achieved by embodiments of this disclosure which describe systems and methods for configuring air interfaces with low overhead.

In accordance with an embodiment, a method for reducing overhead during air interface configuration is provided. In this example, the method includes sending an index and a modification instruction to wireless device. The index is associated with a first one of a plurality of predefined air interface configurations, and the modification instruction indicates a modification of one or more parameters of the first predefined air interface configuration to produce a modified air interface configuration. The index and the modification instruction instruct the wireless device to establish the modified air interface configuration without first establishing the predefined air interface configuration. An apparatus for performing this method is also provided.

In accordance with another embodiment, yet another method for reducing overhead during air interface configuration is provided. In this example, the method includes receiving an index and a modification instruction from a network device at a wireless device. The index is associated with a first one of a plurality of predefined air interface configurations, and the modification instruction indicates a modification of one or more parameters of the first predefined air interface configuration to produce a modified air interface configuration. The method further includes establishing the modified air interface configuration based on the index and the modification instruction without first establishing the predefined air interface configuration. An apparatus for performing this method is also provided.

In accordance with another embodiment, yet another method for reducing overhead during air interface configuration is provided. In this example, the method includes sending indices of a plurality of predefined air interface configurations to a wireless device, and receiving a specific one of the indices from the wireless device. The specific index identifies one of the plurality of predefined air interface configurations selected by the wireless device. An apparatus for performing this method is also provided.

In accordance with another embodiment, yet another method for reducing overhead during air interface configuration is provided. In this example, the method includes receiving indices of a plurality of predefined air interface configurations from a network device at a wireless device, and selecting one of the plurality of predefined air interface configurations. The selected predefined air interface configuration is associated with a specific one of the indices. The method further includes sending the specific index to the network device. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
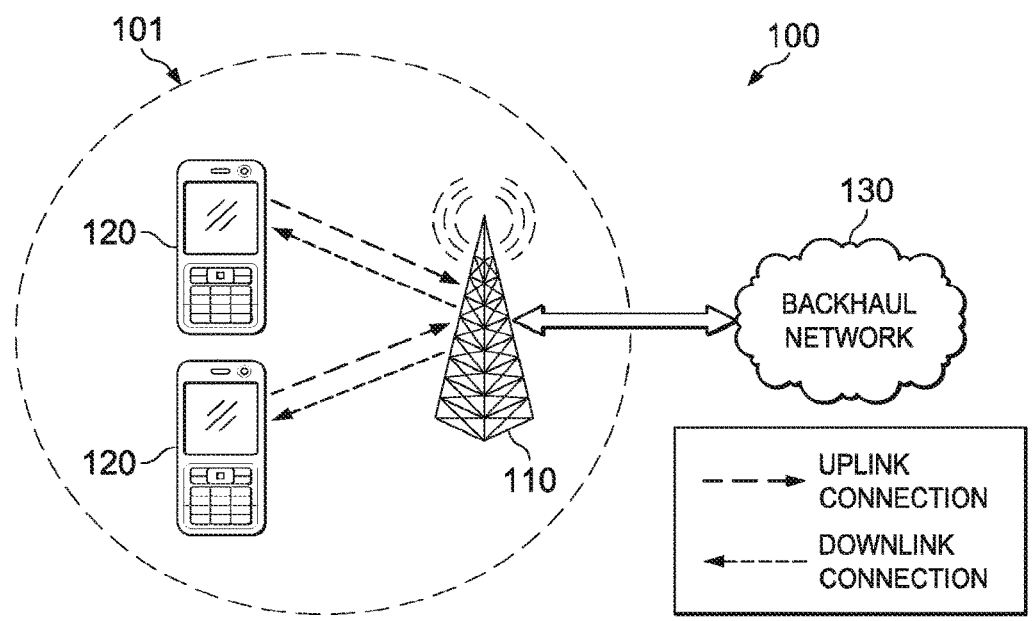
FIG. 1 is a diagram of an embodiment wireless network.

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Network devices may instruct wireless devices to dynamically configure an air interface based on a subset of parameters. The subset of parameters used to configure an air interface are collectively referred to as the "air interface configuration," and may include physical layer parameters, a waveform, a transmission mode, an access scheme, a re-transmission scheme, or a combination thereof. One approach to dynamically configuring an air interface is to communicate an index associated with a predefined air interface configuration to a mobile device via control signaling. More specifically, a pool of candidate air interface configurations are predefined for a network such that the parameters specified by each of the candidate air interface configurations are known by network devices in the network and wireless devices that access the network. Each of the candidate air interface configurations is associated with a different index. The parameters and index associations of the candidate air interface configurations may be stored in a wireless device by the manufacturer. Alternatively, the wireless device may learn the parameters and index associations of candidate air interface configurations predefined for a network during a previous communication session between the wireless device and the network or from a third party, e.g., received from another wireless device, downloaded from a discovery server. The amount of control signaling overhead required to support dynamic air interface configuration when using the aforementioned approach is largely dependent on how many candidate air interface configurations are predefined for the network. A larger pool of candidate air interface configurations will require a larger range of indices, thereby increasing the number of bits needed to signal the index.

Aspects of this disclosure reduce the amount of overhead required to dynamically establish an air interface configuration by communicating a modification instruction along with the index. The modification instruction identifies a modification to one or more parameters of the predefined air interface configuration associated with the index. Together, the index and the modification indication specify a modified air interface configuration that is different than any of the candidate air interface configurations predefined for the network. By communicating the modified air interface instruction along with the index, a network device instructs the wireless device to establish the modified air interface configuration without first establishing the predefined air interface configuration. As used herein, a predefined air interface configuration is "established" when a transmission is performed according to the parameters defined by the predefined air interface configuration. Thus, the modification instruction allows networks to achieve similar degrees of flexibility while using fewer predefined air interface configurations, which in turn permits the index associated with the selected air interface configuration to be signaled using fewer bits. This overhead savings outweighs the control signaling overhead associated with the modification instruction for many network configurations.

In an embodiment, the modification instruction instructs the wireless device to modify a Hybrid Automatic Repeat reQuest (HARQ) retransmission scheme specified by the predefined air interface configuration. In another embodiment, the modification instruction instructs the wireless device to add a HARQ retransmission scheme to, or remove one from, the predefined air interface configuration. In yet another embodiment, the modification instruction instructs the wireless device to modify a waveform of the predefined air interface configuration. For example, the predefined air interface configuration may specify using an orthogonal frequency-division multiplexed (OFDM) waveform, and the modification instruction may instruct the wireless device to use a code division multiplexed (CDM) waveform, rather than the OFDM waveform. In yet another embodiment, the modification instruction instructs the wireless device to modify a physical layer parameter of the predefined air interface configuration. For example, the modification instruction may instruct the wireless device to modify a subcarrier spacing, cyclic prefix (CP) length, symbol duration, and/or transmission time interval (TTI) length associated with the predefined air interface configuration.

Additionally, aspects of this disclosure allow a wireless device to select a predefined air interface configuration. In one embodiment, the network device sends indices associated with multiple predefined air interface configurations to a wireless device. The wireless device then selects one of the predefined air interface configurations, and returns the corresponding index to the network device, which prompts establishment of the selected air interface configuration between the wireless device and a base station in the network.

In some embodiments, the wireless device communicates a modification instruction to a network device to request that a modification be made to an air interface configuration associated with an index. The air interface configuration may have been selected by the network device, in which case the wireless device communicates the modification instruction to the network device after the wireless device receives the index from the network device. Alternatively, the air interface configuration may have been selected by the wireless device, in which case the wireless device communicates the modification instruction along with the index to the network device. These and other aspects are explained in greater detail below.

FIG. 1 is a diagram of a wireless network 100 for communicating data. The wireless network 100 includes a base station no having a coverage area 101, a plurality of mobile devices 120, and a backhaul network 130. As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station. The terms "mobile device," "user equipment (UE)," and "mobile station (STA)" are used interchangeably throughout this disclosure. In some embodiments, the network 100 may comprise various other wireless devices, such as relays. The term wireless device refers to any device that accesses, or facilitates access to, a wireless network, such as a mobile device, relay station, or smart device. The term network device refers to any device that provides, facilitates, or controls access to a wireless network, such as a base station, scheduler, or central controller. In some embodiments, a network device communicates directly with a wireless device. In other embodiments, a network device communicates indirectly with a wireless device, as may occur when a scheduler or central controller communicates with a mobile station via an intermediate base station.

Embodiments of this disclosure use a modification instruction to modify a parameter of a predefined air interface configuration. The modification instruction may indicate a modification to one or more physical layer parameters associated with a predefined air interface configuration. For example, the modification instruction may indicate a modification to any one, or combination of, a transmission time interval (TTI), a symbol duration, a cyclic prefix (CP) length, and a sub-carrier spacing associated with a predefined air interface configuration.

The modification instruction may indicate a modification to a waveform specified by a predefined air interface configuration. The predefined air interface configuration may be associated with any waveform that is capable of carrying a wireless transmission. The modification instruction may indicate that the waveform associated with the predefined air interface configuration is to be substituted with any other waveform that is capable of carrying a wireless transmission. For example, the modification instruction may indicate switching between any of the following waveforms: an OFDM waveform, a single carrier frequency division multiplexed (SC-FDM) waveform, a filter bank multi-carrier (FBMC) waveform, an interleaved frequency division multiplexed (IFDM) waveform, a CDM waveform, a discrete Fourier transform-spread OFDM (DFT-S-OFDM) waveform, a filtered OFDM (F-OFDM) waveform, and a sparse code multiple access (SCMA) waveform.

The modification instruction may indicate a modification to an access scheme associated with a predefined air interface configuration. For example, the modification instruction may indicate switching from a scheduling-based access scheme to a grant-free access scheme, or vice versa. The grant-free access scheme may or may not use contention-based access (e.g., listen before talk, etc.). For instance, one grant-free scenario may allow a UE to use dedicated resources without the need for contention. In another example, the modification instruction may indicate switching from a scheduling-based access scheme or a grant-free access scheme to a mixed access scheme supporting both scheduling-based access and grant-free access. In such an embodiment, a UE may select one or both of the scheduling-based and grant-free access schemes to transmit various types of data. In one example, the UE selects scheduling-based access for long data packet transmissions, and grant-free access for short data packet transmissions. In another example, the UE transmits data for delay-sensitive applications using a grant-free access scheme, and transmits data for delay-tolerant applications using a scheduling-based access scheme. In some embodiments, an air interface configuration specifies different access techniques for different sets of resources. For example, the air interface configuration may specify that some resources are accessed via contention-based grant-free access and other resources are accessed via a scheduling-based access. The modification instruction may indicate a modification of a re-transmission scheme associated with a predefined air interface configuration. For example, the modification instruction may indicate that a parameter of a HARQ re-transmission scheme (e.g., a round-trip-time, etc.) is to be modified. Alternatively, the modification instruction may indicate that a HARQ re-transmission scheme is to be added to, or removed from, the subset of parameters associated with the predefined air interface configuration.

Figure 2:
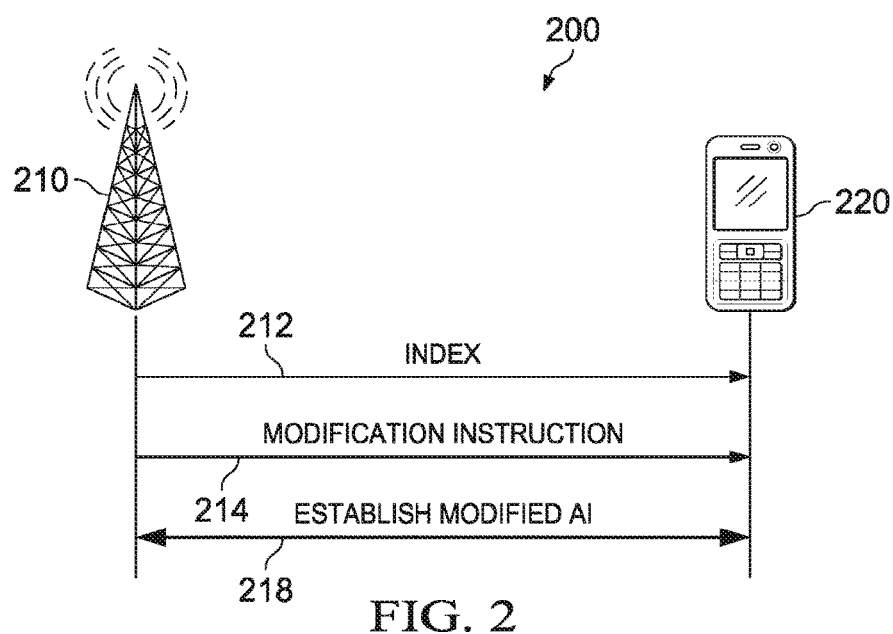
FIG. 2 is a diagram of an embodiment communications sequence for establishing an air interface configuration.

Embodiments of this disclosure provide methods for using a modification instruction and an index to establish a modified air interface configuration. FIG. 2 is a diagram of an embodiment communications sequence 200 for establishing an air interface configuration. In the communications sequence 200, a network device 210 sends an index 212 and a modification instruction 214 to a wireless device 220. In this example, the network device 210 is a base station and the wireless device 220 is a UE. In other examples, the network device 210 may be a network controller, and the wireless device 220 may be a base station, a relay, or any other device configured to communicate over an air interface. The index 212 is associated with a predefined air interface configuration. The association between the index 212 and the predefined air interface configuration may be a priori information to the wireless device 220. For example, the wireless device 220 may maintain a look up table that associates a set of indices with a set of predefined air interface configurations. The modification instruction 214 indicates a modification to one or more parameters of the predefined air interface configuration associated with the index 212. After receiving the index 212 and the modification instruction 214, the wireless device 220 establishes the modified AI 218 without first establishing the predefined air interface configuration. The index 212 and the modification instruction 214 may be transmitted together in the same control signaling message or separately in different control signaling messages.

In an embodiment, the modification instruction 214 instructs the wireless device 220 to modify a HARQ retransmission scheme specified by the predefined air interface configuration. In another embodiment, the modification instruction 214 instructs the wireless device 220 to add, or remove, a HARQ retransmission scheme to, or from, the predefined air interface configuration associated with the index 212. In yet another embodiment, the modification instruction 214 instructs the wireless device 220 to modify a waveform of the predefined air interface configuration associated with the index 212. For example, the predefined air interface configuration may specify using an OFDM waveform, and the modification instruction 214 may instruct the wireless device 220 to use a CDM waveform, rather than the OFDM waveform. In yet another embodiment, the modification instruction 214 instructs the wireless device 220 to modify a physical layer parameter of the predefined air interface configuration associated with the index 212. For example, the modification instruction 214 may instruct the wireless device 220 to modify a subcarrier spacing, CP length, symbol duration, and/or TTI length associated with the predefined air interface configuration associated with the index 212.

Figure 3:
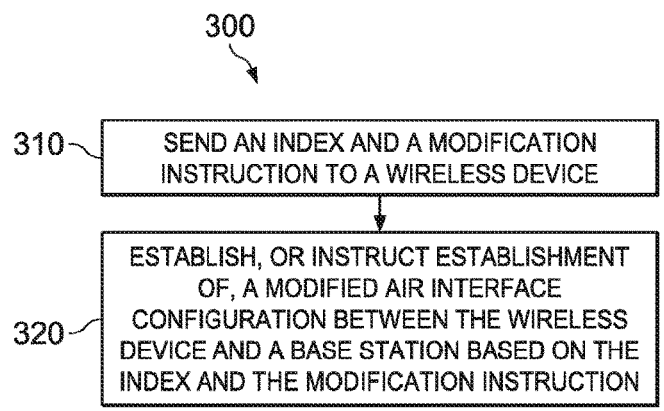
FIG. 3 is a flowchart of an embodiment method for dynamically establishing an air interface configuration.

FIG. 3 is a flowchart of an embodiment method 300 for dynamically establishing an air interface configuration, as might be performed by a network device. At step 310, the network device sends an index and a modification instruction to a wireless device. The index is associated with one of the candidate air interface configurations predefined by the network, and the modification instruction indicates a modification of one or more parameters of the predefined air interface configuration. Together, the index and the modification instruction identify a modified air interface configuration. At step 320, the network device establishes, or instructs the establishment of, the modified air interface configuration between the wireless device and a base station based on the index and the modification instruction. The modified air interface configuration is established between the wireless device and the base station without first establishing the predefined air interface configuration between the wireless device and the base station.

Figure 4:
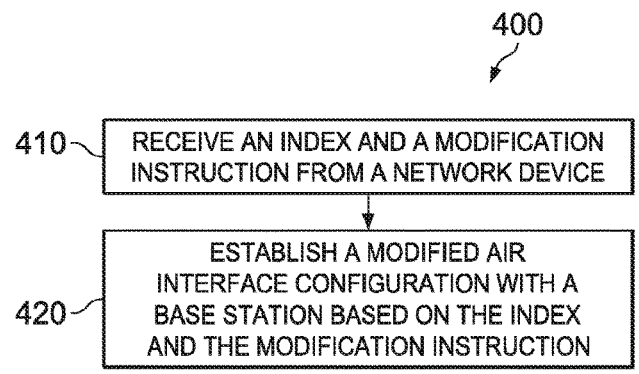
FIG. 4 is a flowchart of another embodiment method for dynamically establishing an air interface configuration.

FIG. 4 is a flowchart of an embodiment method 400 for dynamically establishing an air interface configuration, as might be performed by a wireless device. At step 310, the wireless device receives an index and a modification instruction from a network device. At step 320, the wireless device establishes a modified air interface configuration with a base station based on the index and the modification instruction. The network device that communicates the index and modification instruction may be the base station or another network device (e.g., a central controller). The modified air interface configuration is established between the wireless device and the base station without first establishing the predefined air interface configuration between the wireless device and the base station.

Figure 5:
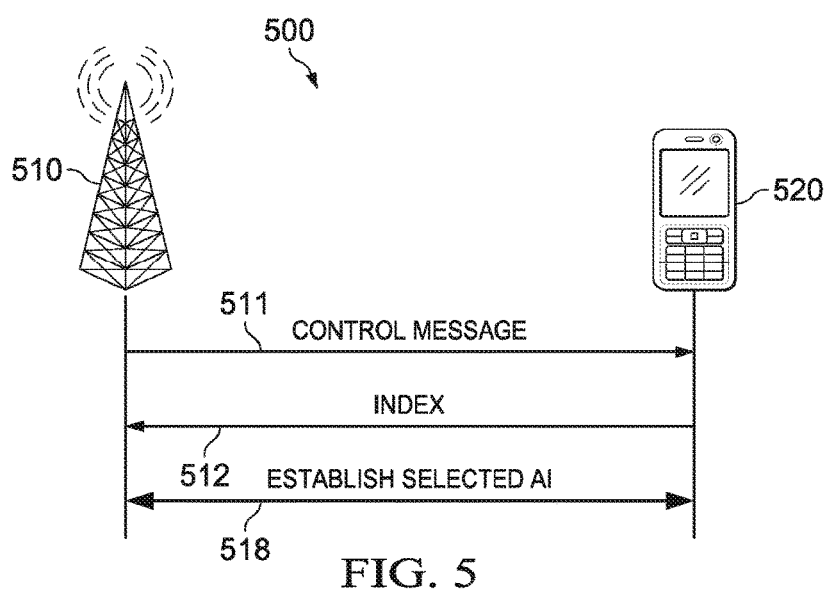
FIG. 5 is a diagram of another embodiment communications sequence for establishing an air interface configuration.

Embodiments of this disclosure allow a wireless device to select a predefined air interface configuration. FIG. 5 is a diagram of an embodiment communications sequence 500 for establishing an air interface configuration. In the communications sequence 500, a network device 510 sends at least one control message 511 to indicate multiple candidate air interface configurations to a wireless device 520. In this example, the network device 510 is a base station and the wireless device 520 is a UE. In other examples, the network device 510 may be a network controller, and the wireless device 520 may be a base station, a relay, or any other device configured to communicate over an air interface. In one embodiment, the control message 511 carries a list of information elements, each of which indicates parameters for a different one of the candidate air interface configurations. In another embodiment, the control message 511 carries a list of indices associated with a subset of pre-defined air interface configurations. By way of example, the wireless device 520 may maintain a look up table that associates a set of indices with a set of predefined air interface configurations, and the list of indices in the control message 511 may include a subset of indices from the set of indices stored in the look up table. The wireless device 520 may then select one of the candidate air interface configurations indicated by the control message 511. Air interface configurations that are excluded from the control message 511, or that are associated with indices excluded from the list of indices in the control message 511, may not be available for selection by the wireless device. The wireless device 520 may then communicate an index 512 associated with the selected air interface configuration to the network device 510. In some embodiments, the multiple candidate air interface configurations are a priori information to the wireless device 520, and the wireless device 520 communicates the index 512 without receiving the control message 511 from the network device 510. For example, the multiple candidate air interface configurations may have been known from a previous session between the wireless device 520 and the network device, or otherwise hard-coded in the memory of the wireless device 520 by the manufacturer. After receiving the index 512, the network device 510 may establish the selected air interface 518 with the wireless device.

Figure 6:
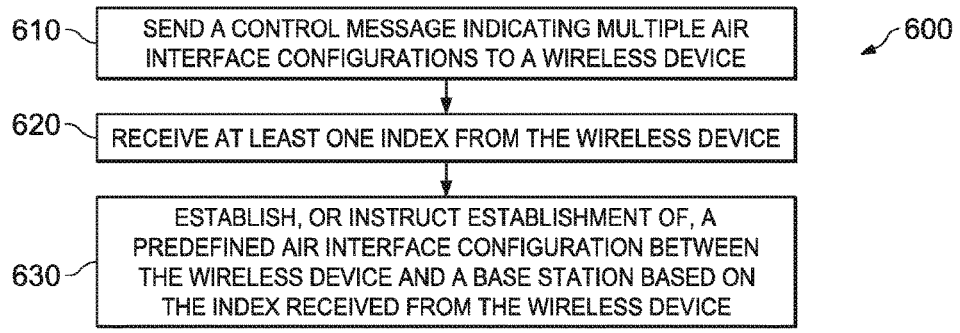
FIG. 6 is a flowchart of yet another embodiment method for dynamically establishing an air interface configuration.

FIG. 6 is a flowchart of an embodiment method 600 for dynamically establishing an air interface configuration, as might be performed by a network device. At step 610, the network device sends a control message indicating multiple candidate air interface configurations to a wireless device. At step 620, the network device receives at least one index from the wireless device. In one embodiment, the network device receives a single index associated with a specific one of the candidate air interface configurations indicated in the control message. The specific candidate air interface configuration may have been selected by the wireless device after receiving the control message. In another embodiment, the network device receives the indices associated with a subset of candidate air interface configurations indicated in the control message. The indices may be associated with a subset of the air interface configurations deemed acceptable to, or preferred by, the wireless device. At step 630, the network device establishes, or instructs the establishment of, a predefined air interface configuration associated with an index received from the wireless device. The index may be the only index received by the wireless device, or one of multiple indices received from the wireless device.

Figure 7:
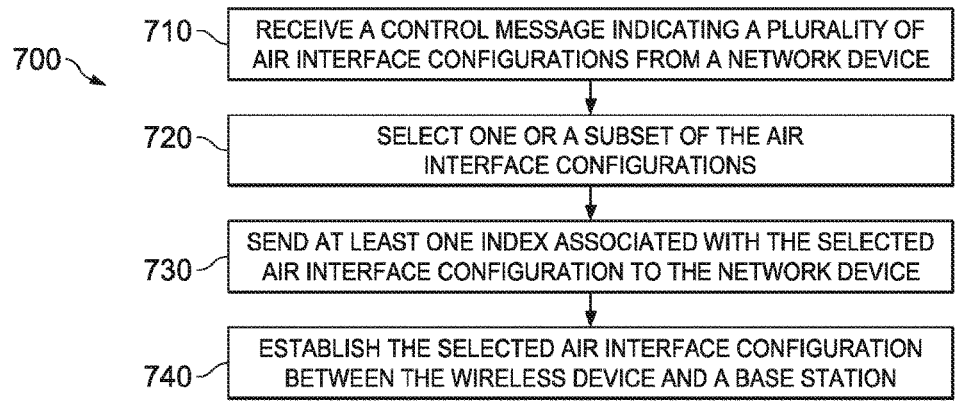
FIG. 7 is a flowchart of yet another embodiment method for dynamically establishing an air interface configuration.

FIG. 7 is a flowchart of an embodiment method 700 for dynamically establishing an air interface configuration, as may be performed by a wireless device. At step 710, the wireless device receives a control message indicating multiple air interface configurations from a network device. At step 720, the wireless device selects one or more of the air interface configurations. At step 730, the wireless device sends one or more indices associated with the one or more selected air interface configurations to the network device. At step 740, the wireless device establishes an air interface configuration with a base station.

Figure 8:
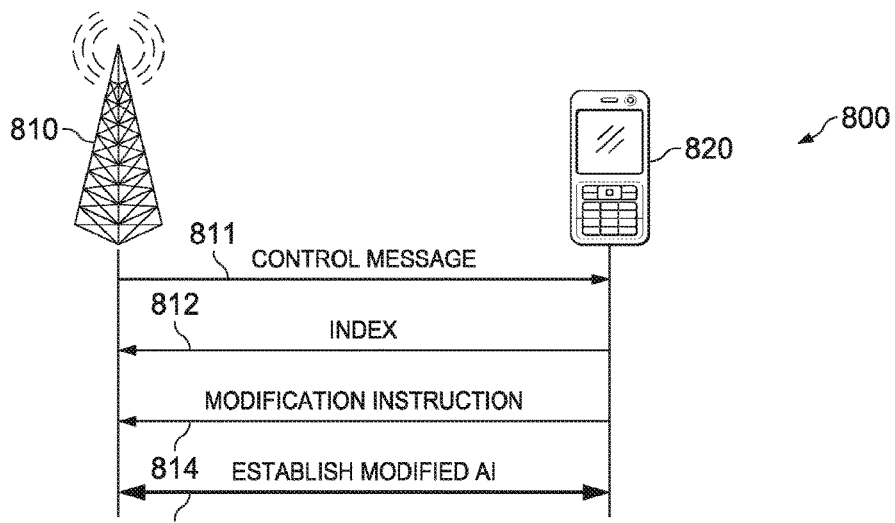
FIG. 8 is a diagram of yet another embodiment communications sequence for establishing an air interface configuration.

FIG. 8 is a diagram of an embodiment communications sequence 800 for establishing an air interface configuration. In the communications sequence 800, a network device 810 sends a control message 811 to a wireless device 820. In this example, the network device 810 is a base station and the wireless device 820 is a UE. In other examples, the network device 810 may be a network controller, and the wireless device 820 may be a base station, a relay, or any other device configured to communicate over an air interface. In one embodiment, the control message 811 carries a list of information elements, each of which indicates parameters for a different candidate air interface configuration. In another embodiment, the control message 811 carries a list of indices associated with a subset of pre-defined air interface configurations. By way of example, the wireless device 820 may maintain a look up table that associates a set of indices with a set of predefined air interface configurations, and the list of indices in the control message 811 may include a subset of indices from the set of indices stored in the look up table The wireless device 820 may then select one of the candidate air interface configurations indicated by the control message 811, and then send an index 812 associated with the selected air interface configuration and a modification instruction 814 to the network device 810. The modification instruction 814 indicates a modification to one or more parameters of the predefined air interface configuration associated with the index 812. After receiving the index 812 and the modification instruction 814, the network device 810 establishes the modified air interface configuration 818 without first establishing the predefined air interface configuration.

In an embodiment, the modification instruction 814 requests that the network device 810 modify a HARQ retransmission scheme specified by the predefined air interface configuration associated with the index 812. In another embodiment, the modification instruction 814 requests that the network device 810 add, or remove, a HARQ retransmission scheme to, or from, the predefined air interface configuration associated with the index 812. In yet another embodiment, the modification instruction 814 requests that the network device 810 modify a waveform of the predefined air interface configuration associated with the index 812. For example, the predefined air interface configuration may specify using an OFDM waveform, and the modification instruction 814 may instruct the wireless device 220 to use a CDM waveform, rather than the OFDM waveform. In yet another embodiment, the modification instruction 814 requests that the network device 810 modify a physical layer parameter of the predefined air interface configuration associated with the index 812. For example, the modification instruction 814 may requests that the network device 810 modify a subcarrier spacing, CP length, symbol duration, and/or TTI length associated with the predefined air interface configuration associated with the index 812.

Figure 9:
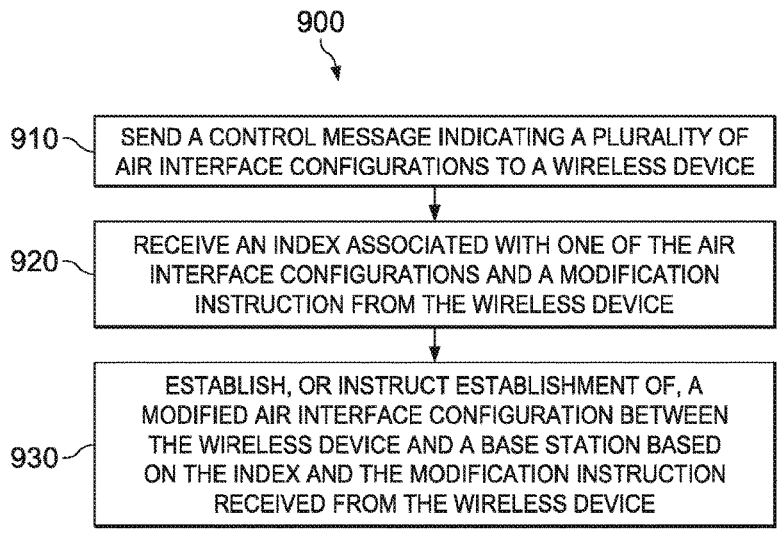
FIG. 9 is a flowchart of yet another embodiment method for dynamically establishing an air interface configuration.

In some embodiments, a wireless device sends an index and a modification instruction to a network device to request establishment of a modified air interface configuration. FIG. 9 is a flowchart of an embodiment method 900 for dynamically establishing an air interface configuration, as might be performed by a network device. At step 910, the network device sends a control message indicating multiple candidate air interface configurations to a wireless device. At step 920, the network device receives an index and a modification instruction from the wireless device. The index is associated with one of the candidate air interface configurations indicated in the control message. At step 930, the network device establishes, or instructs the establishment of, a modified air interface configuration based on the index and modification instruction received by the wireless device.

Figure 10:
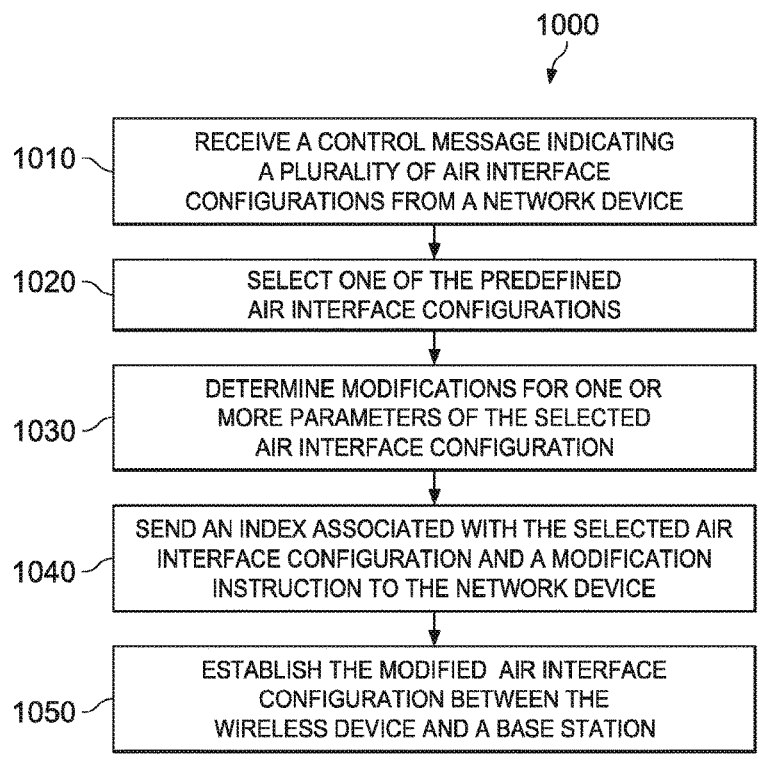
FIG. 10 is a flowchart of yet another embodiment method for dynamically establishing an air interface configuration.

FIG. 10 is a flowchart of an embodiment method 1000 for dynamically establishing an air interface configuration, as might be performed by a wireless device. At step 1010, the wireless device receives a control message indicating multiple candidate air interface configurations from a network device. At step 1020, the wireless device selects one of the air interface configurations. At step 1030, the wireless device determines modifications for one or more parameters of the selected air interface configuration. At step 1040, the wireless device sends an index associated with the selected air interface and a modification instruction identifying the modified parameters to the network device. At step 1060, the wireless device establishes the modified air interface configuration with a base station.

Figure 11:
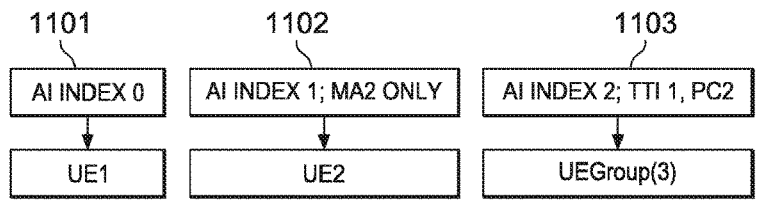
FIG. 11 is a diagram of embodiment control signaling messages.

FIG. 11 is a diagram of embodiment control messages 1101-1103 that include signaling to indicate an index associated with a predefined air interface configuration. The control messages 1102, 1103 further include modification instructions to instruct the wireless devices receiving the control instructions to modify a parameter of the predefined air interface configuration. Table 1 identifies the predefined air interface configurations referenced in FIG. 11.

TABLE 1

| AI index | WF | Frame Structure | TTI Length | MA Type | Protocol Configuration |
|---|---|---|---|---|---|
| 0 | WF1 | FS1 | TTI1 | MA2 only | PC1 |
| 1 | WF2 | FS2 | TTI1 | MA1 & MA2 | PC2 |
| 2 | WF1 | FS3 | TTI2 | MA1 only | PC1 |

In this example, the control message 1101 instructs a UE (UE1) to use a predefined air interface configuration associated with the index 0. The control message 1102 instructs a UE (UE2) to modify a multiple access (MA) scheme of a predefined air interface configuration associated with the index 1. According to Table 2, a first MA type (MA1) and a second MA type (MA2) are defined by the predefined air interface configuration associated with the index 1. The modification instruction in the control message 1102 instructs the UE2 to remove the MA1 from the predefined air interface configuration associated with the index 1. The control message 1103 instructs a UE group (UEGroup(3)) to modify a TTI duration and a protocol configuration of a predefined air interface configuration associated with the index 2. According to Table 2, a second TTI duration (TTI2) and a first protocol configuration (PC1) are defined by the predefined air interface configuration associated with the index 2. The modification instructions in the control message 1103 instruct the UEGroup(3) to modify the predefined air interface configuration associated with the index 2 by substituting a first TTI duration (TTI1) for TTI2 and by substituting a second protocol configuration (PC2) for PC1.

Figure 12:
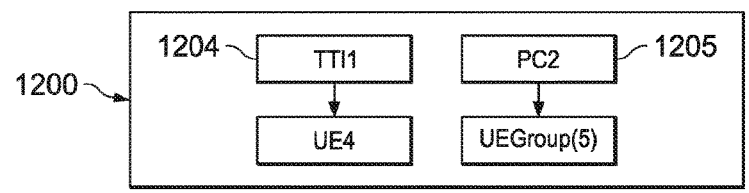
FIG. 12 is a diagram of an embodiment control signaling message.

In some embodiments, multiple modification instructions for different UEs and/or UE groups may be included in a single control message, which may be multicast or broadcast to the UEs and/or UE groups. FIG. 12 is a diagram of an embodiment control message 1200 that includes signaling to modify a predefined air interface configuration. In this example, the control message 1200 includes a modification instruction 1204 that instructs a UE (UE3) to modify a TTI parameter of a predefined air interface configuration. The control message 1200 further includes a modification instruction 1205 that instructs a UE group (UEgroup(5)) to modify a protocol configuration of a predefined air interface configuration. In some embodiments, the control message 1200 includes an index to identify the air interface configuration being modified. In other embodiments, the air interface configuration is a generic configuration that is a priori information to the UE4 and UEGroup(5), in which case the index may be excluded from the control message 1200.

Control messages may carry information for one or more UEs and/or UE groups (e.g., UE1, UE group(2), etc.), and may be communicated from a network device to one or more wireless devices. In some embodiments, a control message implicitly indicates AI parameters by mapping wireless resources (e.g., a time-frequency block) to the AI parameters (e.g., subcarrier spacing & TTI length). In some embodiments, a control message indicates a predefined air interface configuration selected from a set of predefined air interface configurations, as well as modifications for one or more UEs and/or group of UEs.

Figure 13:
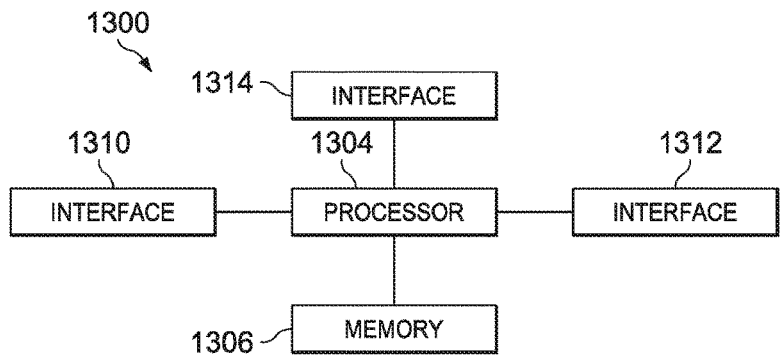
FIG. 13 is a diagram of an embodiment processing system.

FIG. 13 is a block diagram of an embodiment processing system 1300 for performing methods described herein, which may be installed in a host device. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
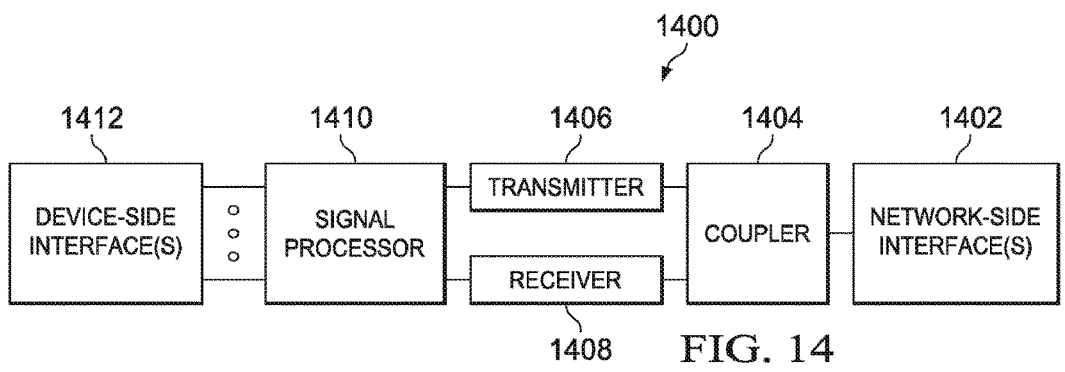
FIG. 14 is a diagram of an embodiment transceiver.

In some embodiments, one or more of the interfaces 1310, 1312, 1314 connects the processing system 1300 to a transceiver adapted to transmit and receive signaling over the telecommunications network. FIG. 14 is a block diagram of a transceiver 1400 adapted to transmit and receive signaling over a telecommunications network. The transceiver 1400 may be installed in a host device. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing and/or a selecting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for configuring an air interface, the method comprising:
   receiving, by a wireless device, an index and a modification instruction from a network device, the index identifying a first predefined air interface configuration of a plurality of predefined air interface configurations, and the modification instruction indicating a modification of fewer than all parameters of the first predefined air interface configuration identified by the index, the index and the modification instruction instructing the wireless device to establish a modified air interface configuration; and
   transmitting a signal over the modified air interface configuration, wherein the modified air interface configuration is different than each of the plurality of predefined air interface configurations.

2. The method of claim 1, wherein the modification instruction instructs the wireless device to modify, add, or remove a Hybrid Automatic Repeat reQuest (HARQ) retransmission scheme in, to, or from the first predefined air interface configuration.

3. The method of claim 1, wherein the modification instruction instructs the wireless device to modify a waveform of the first predefined air interface configuration.

4. The method of claim 1, wherein the modification instruction instructs the wireless device to modify a physical layer parameter of the first predefined air interface configuration.

5. The method of claim 4, wherein the modification instruction instructs the wireless device to modify a subcarrier spacing of the first predefined air interface configuration.

6. The method of claim 4, wherein the modification instruction instructs the wireless device to modify a cyclic prefix (CP) length of the first predefined air interface configuration.

7. The method of claim 4, wherein the modification instruction instructs the wireless device to modify a symbol duration of the first predefined air interface configuration.

8. The method of claim 4, wherein the modification instruction instructs the wireless device to modify a transmission time interval (TTI) length of the first predefined air interface configuration.

9. The method of claim 1, the index and the first predefined air interface configuration being stored in the wireless device before the receiving.

10. A wireless device comprising:
a processor; and
a non-transitory computer readable storage medium storing programming for execution by the processor, the programming including instructions to:
receive an index and a modification instruction from a network device, the index identifying a first predefined air interface configuration of a plurality of predefined air interface configurations, and the modification instruction indicating a modification of fewer than all parameters of the first predefined air interface configuration identified by the index, the index and the modification instruction instructing the wireless device to establish a modified air interface configuration; and
transmit a signal over the modified air interface configuration, wherein the modified air interface configuration is different than each of the plurality of predefined air interface configurations.

11. The wireless device of claim 10, wherein the modification instruction instructs the wireless device to modify, add, or remove a Hybrid Automatic Repeat reQuest (HARQ) retransmission scheme in, to, or from the first predefined air interface configuration.

12. The wireless device of claim 10, wherein the modification instruction instructs the wireless device to modify a waveform of the first predefined air interface configuration.

13. The wireless device of claim 10, wherein the modification instruction instructs the wireless device to modify a physical layer parameter of the first predefined air interface configuration.

14. The wireless device of claim 13, wherein the modification instruction instructs the wireless device to modify a subcarrier spacing of the first predefined air interface configuration.

15. The wireless device of claim 13, wherein the modification instruction instructs the wireless device to modify a cyclic prefix (CP) length of the first predefined air interface configuration.

16. The wireless device of claim 13, wherein the modification instruction instructs the wireless device to modify a symbol duration of the first predefined air interface configuration.

17. The wireless device of claim 13, wherein the modification instruction instructs the wireless device to modify a transmission time interval (TTI) length of the first predefined air interface configuration.

18. A method for configuring an air interface, the method comprising:
sending, by a network device, an index and a modification instruction to a wireless device, the index identifying a first predefined air interface configuration of a plurality of predefined air interface configurations, and the modification instruction indicating a modification of fewer than all parameters of the first predefined air interface configuration identified by the index, the index and the modification instruction instructing the wireless device to establish a modified air interface configuration, wherein the modified air interface configuration is different than each of the plurality of predefined air interface configurations.

19. The method of claim 18, wherein the modification instruction instructs the wireless device to modify, add, or remove a Hybrid Automatic Repeat reQuest (HARQ) retransmission scheme of the first predefined air interface configuration.

20. The method of claim 18, wherein the modification instruction instructs the wireless device to modify a waveform of the first predefined air interface configuration.

21. The method of claim 18, wherein the modification instruction instructs the wireless device to modify a physical layer parameter of the first predefined air interface configuration.

22. The method of claim 21, wherein the modification instruction instructs the wireless device to modify a subcarrier spacing, cyclic prefix (CP) length, symbol duration, or transmission time interval (TTI) length of the first predefined air interface configuration.

23. A network device comprising:
a processor; and
a non-transitory computer readable storage medium storing programming for execution by the processor, the programming including instructions to:
send an index and a modification instruction to a wireless device, the index identifying a first predefined air interface configuration of a plurality of predefined air interface configurations, and the modification instruction indicating a modification of fewer than all parameters of the first predefined air interface configuration identified by the index, the index and the modification instruction instructing the wireless device to establish a modified air interface configuration, wherein the modified air interface configuration is different than each of the plurality of predefined air interface configurations.

24. The network device of claim 23, wherein the modification instruction instructs the wireless device to modify, add, or remove a Hybrid Automatic Repeat reQuest (HARQ) retransmission scheme in, to, or from the first predefined air interface configuration.

* * * * *